United States Patent
Joshi

(10) Patent No.: US 10,505,943 B2
(45) Date of Patent: Dec. 10, 2019

(54) ENABLING USERS TO PERFORM OPERATIONS THAT REQUIRE ELEVATED PRIVILEGES

(71) Applicant: Wyse Technology L.L.C., Santa Clara, CA (US)

(72) Inventor: Salil Joshi, Fremont, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 172 days.

(21) Appl. No.: 15/458,251

(22) Filed: Mar. 14, 2017

(65) Prior Publication Data

US 2018/0270249 A1    Sep. 20, 2018

(51) Int. Cl.
*G06F 21/62* (2013.01)
*H04L 29/06* (2006.01)
*G06F 21/71* (2013.01)

(52) U.S. Cl.
CPC .................... *H04L 63/105* (2013.01)

(58) Field of Classification Search
None
See application file for complete search history.

(56) References Cited

U.S. PATENT DOCUMENTS

| | | | | |
|---|---|---|---|---|
| 6,775,781 B1 * | 8/2004 | Phillips | ................... | G06F 21/33 726/4 |
| 7,653,934 B1 * | 1/2010 | Joshi | ................... | G06F 21/6218 726/4 |
| 2002/0078378 A1 * | 6/2002 | Burnett | ................... | G06F 21/31 726/18 |
| 2007/0006297 A1 * | 1/2007 | Verbowski | .......... | G06F 21/6218 726/16 |
| 2007/0006323 A1 * | 1/2007 | Verbowski | .......... | G06F 21/6218 726/27 |
| 2011/0010454 A1 * | 1/2011 | Anuff | ..................... | G06Q 10/10 709/225 |
| 2012/0151185 A1 * | 6/2012 | Bybell | ................ | G06F 9/30076 712/205 |
| 2013/0268997 A1 * | 10/2013 | Clancy, III | .............. | G06F 21/53 726/1 |

(Continued)

FOREIGN PATENT DOCUMENTS

EP           1811397 A1 *   7/2007   ......... G06F 21/6227

*Primary Examiner* — Venkat Perungavoor
(74) *Attorney, Agent, or Firm* — Kirton McConkie; Brian Tucker

(57) ABSTRACT

Users can be enabled to perform operations that require elevated privileges in a controlled manner. An agent can be executed on a user's computing device with admin privileges. When the user desires to perform an operation that user's privileges do not allow, the user can submit a request to an administrator. If the administrator approves the request, the agent can be notified that an operation needs to be performed. The agent can then obtain the necessary information for performing the operation and either perform the requested operation directly or perform one or more other operations to enable the user to perform the requested operation. In cases where the agent's actions grant elevated privileges to the user, the agent can be further configured to revoke the elevated privileges at a subsequent time to thereby prevent the user from retaining elevated privileges indefinitely.

20 Claims, 5 Drawing Sheets

(56) References Cited

U.S. PATENT DOCUMENTS

| | | | |
|---|---|---|---|
| 2014/0033321 A1* | 1/2014 | Patidar | G06F 21/6218 |
| | | | 726/27 |
| 2015/0026215 A1* | 1/2015 | Goel | G06F 21/604 |
| | | | 707/784 |
| 2015/0347741 A1* | 12/2015 | Krstic | G06F 21/32 |
| | | | 726/19 |
| 2016/0092802 A1* | 3/2016 | Theebaprakasam | |
| | | | G06Q 10/0631 |
| | | | 705/7.12 |
| 2016/0294840 A1* | 10/2016 | El Khoury | G06F 21/604 |
| 2016/0294881 A1* | 10/2016 | Hua | H04L 63/20 |
| 2016/0314286 A1* | 10/2016 | Dusad | G06F 21/121 |

* cited by examiner

ENABLING USERS TO PERFORM OPERATIONS THAT REQUIRE ELEVATED PRIVILEGES

CROSS-REFERENCE TO RELATED APPLICATIONS

N/A

BACKGROUND

Thin clients are typically configured to restrict the type of operations that can be performed by a non-administrator user. For example, a thin client operating system may not allow a non-administrator user to change desktop, mouse or keyboard settings or to enable access to USB peripheral devices. Instead, the non-administrator user will typically be required to contact the IT helpdesk to request that an administrator log in to the thin client with admin credentials and make the desired changes. Oftentimes it may also be necessary to perform a number of reboots when making such changes. This will result in substantial downtime and extra work for the administrators.

In some environments where an administrator may not be able to physically visit the thin client or log in remotely, it may be required to share the admin credentials with the non-administrator user to allow the user to make the desired changes. This sharing of admin credentials would defeat the purpose of restricting the type of operations that a non-administrator can perform.

In some cases, after an administrator has made a change to grant access to an otherwise restricted resource or feature, it will be necessary for the administrator to revoke the access privileges. Otherwise, the non-administrator would retain the elevated privileges indefinitely. However, it is possible that the administrator will forget to return to the thin client to revert the settings to their default configurations. For example, a user may need temporary access to USB ports in order to download a file to a flash drive. In such a situation, the administrator could reconfigure the user's thin client to allow access to the USB ports with the intention of returning 30 minutes later to revoke the access. If the administrator happens to forget, the user will retain access to the USB ports indefinitely thereby creating a security risk.

BRIEF SUMMARY

The present invention extends to methods, systems, and computer program products for enabling users to perform operations that require elevated privileges in a controlled manner. An agent can be executed on a user's computing device with admin privileges. When the user desires to perform an operation that user's privileges do not allow, the user can submit a request to an administrator. If the administrator approves the request, the agent can be notified that an operation needs to be performed. An administrator can be allowed to approve or reject such requests on a case-by-case basis and/or by setting up automation policies which define whether a request should be automatically approved or denied. When a request is approved, the agent can obtain the necessary information for performing the operation and either perform the requested operation directly or perform one or more other operations to enable the user to perform the requested operation. In cases where the agent's actions grant elevated privileges to the user, the agent can be further configured to revoke the elevated privileges at a subsequent time to thereby prevent the user from retaining elevated privileges indefinitely.

In some embodiments, the present invention is implemented as method for enabling a user to perform operations that require elevated privileges. While a user that does not have admin privileges is logged in to a computing device, an agent is executed with admin privileges on the computing device. The agent receives a notification of a requested operation that the user has requested be performed on the computing device. The requested operation requires greater privileges than the user has on the computing device. The agent uses the admin privileges to perform the requested operation on the computing device or to perform one or more operations to enable the user to perform the requested operation.

In another embodiment, the present invention is implemented as a method for enabling a user to perform operations that require elevated privileges. A management server receives a request that an operation be performed on a computing device when a user of the computing device does not have privileges sufficient to perform the operation. The management server generates a notification of the requested operation. An agent that is executing with admin privileges on the computing device detects the notification of the requested operation. In response to detecting the notification of the requested operation, the agent either performs the requested operation on the computing device using the admin privileges or performs one or more operations using the admin privileges that enable the user to perform the requested operation.

In another embodiment, the present invention is implemented as computer storage media storing computer executable instructions which when executed perform a method for enabling a user to perform operations that require elevated privileges. The method includes: receiving, at a management server, administrator input that approves a request that an operation be performed on a computing device, wherein a user of the computing device does not have privileges sufficient to perform the operation; notifying an agent that is executing on the computing device with admin privileges that the requested operation has been approved; and performing, by the agent, the requested operation or one or more operations to enable the user to perform the requested operation on the computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, a computing device should be construed as any type of computing device that includes an operating system which limits access to specific operations based on a profile of a current user (i.e., whether or not the user is an administrator). For example, a computing device can be a desktop or laptop running a version of the Windows 10 operating system. A thin client is a type of computing device that implements a remote display protocol to allow a user to log in to a remote session on a server and oftentimes includes reduced hardware components. For purposes of this disclosure, a thin client and a zero client should be construed as synonymous.

In the case of a thin client, a local operating system (as distinguished from the operating system on the remote server) will be installed on the thin client and will limit access to various operations such as is described in the background. Because the present invention may be particularly suited for implementation on thin clients, the description of the invention will be made in the context of a thin client. However, the techniques of the present invention could equally be implemented on other types of computing devices, and the claims should therefore be construed according.

Figure 1:
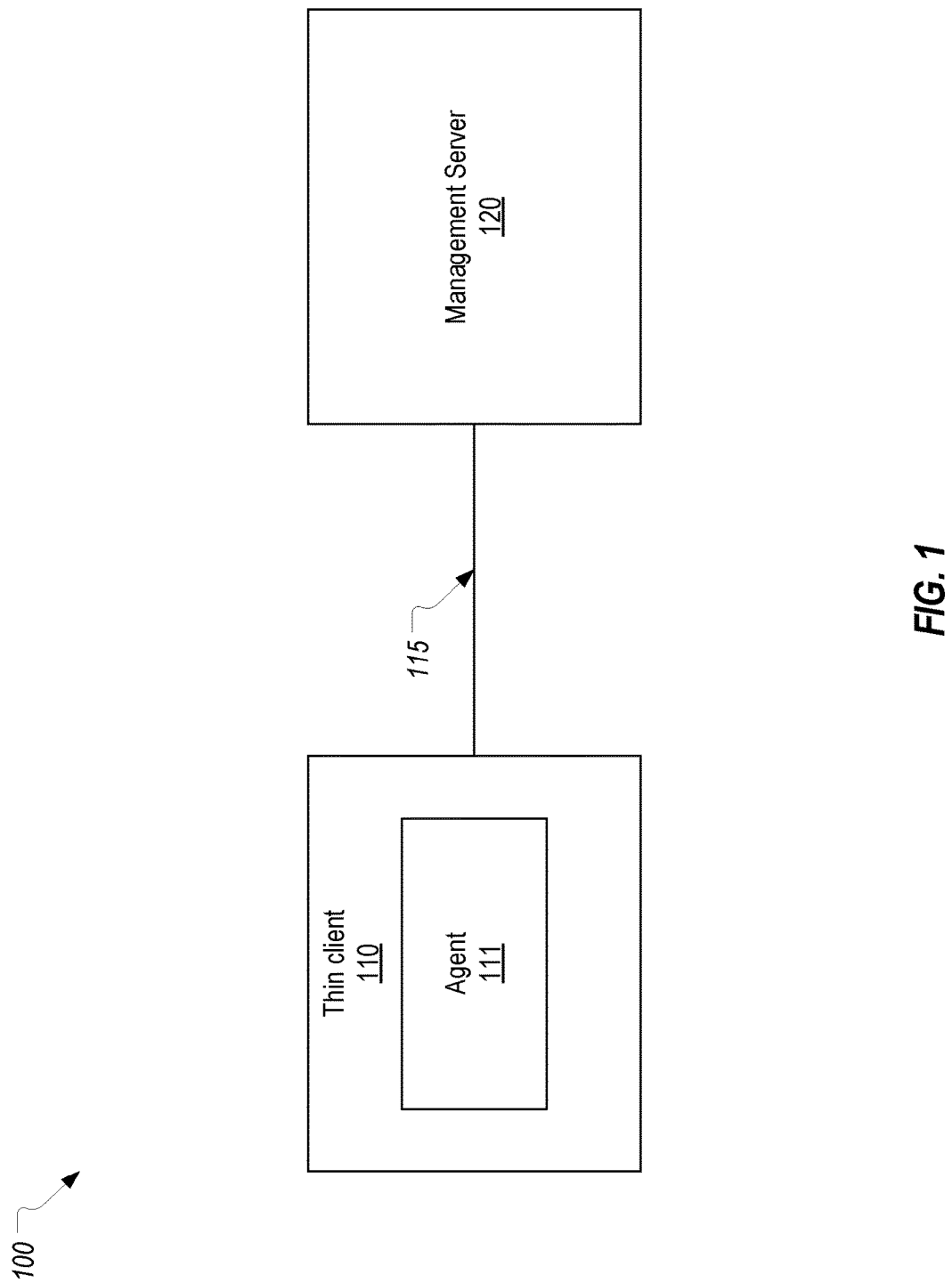
FIG. 1 illustrates an example computing environment in which the present invention can be implemented.

FIG. 1 illustrates an example computing environment 100 in which the present invention can be implemented. Computing environment 100 includes a thin client 110 (which may equally be a non-thin client computing device) that is connected via a network 115 to management server 120. Thin client 110 includes an agent 111 which is a service that runs with admin privileges on thin client 110. Management server 120 can generally represent any computing device or computing devices that an administrator may use for the purpose of informing agent 111 on thin client 110 (or more appropriately, on any number of thin clients 110) when an operation that requires elevated privileges has been approved.

Agent 111 can have admin privileges on thin client 110 but will remain inaccessible to a user of thin client 110. Therefore, the user will not be able to directly access agent 111 for the purposes of performing an operation that requires admin privileges. As an example, an operating system on thin client 110 may prevent a non-administrator user (hereinafter simply "user") from changing various settings. In contrast, because agent 111 runs with admin privileges, the operating system will not prevent agent 111 from changing these same settings.

In accordance with embodiments of the present invention, agent 111 can be configured to perform an operation that requires admin privileges only when instructed by management server 120 to do so. Therefore, when a user desires to perform an operation on thin client 110 that requires admin privileges to accomplish, the user will be required to submit a request to an administrator who can then employ management server 120 to instruct agent 111 to perform the desired operation. Since agent 111 is already running on thin client 110 and has the necessary admin privileges, the desired operation can be performed without requiring the administrator to log in to thin client 110 to make the changes. This will therefore reduce the burden on the administrator and possibly eliminate the need to reboot thin client 110 or perform a logoff/login cycle.

The operation that agent 111 may perform in any given case may be the operation that was requested by the user or one or more operations that will allow the user to perform the requested operation himself. As an example, a user may request that a specific setting be changed to a specific value. In such a case, agent 111 could directly change the setting without further involvement from the user (e.g., by changing the mouse from a right-hand mouse to a left-hand mouse). In contrast, a user may request the ability to change a specific setting. In such a case, agent 111 could perform an operation that would provide the user with temporary elevated privileges (e.g., admin privileges) to change the specific setting to a desired value (e.g., by granting the user temporary elevated privileges so that the user can set a desired photo as the desktop background).

Figure 2A:
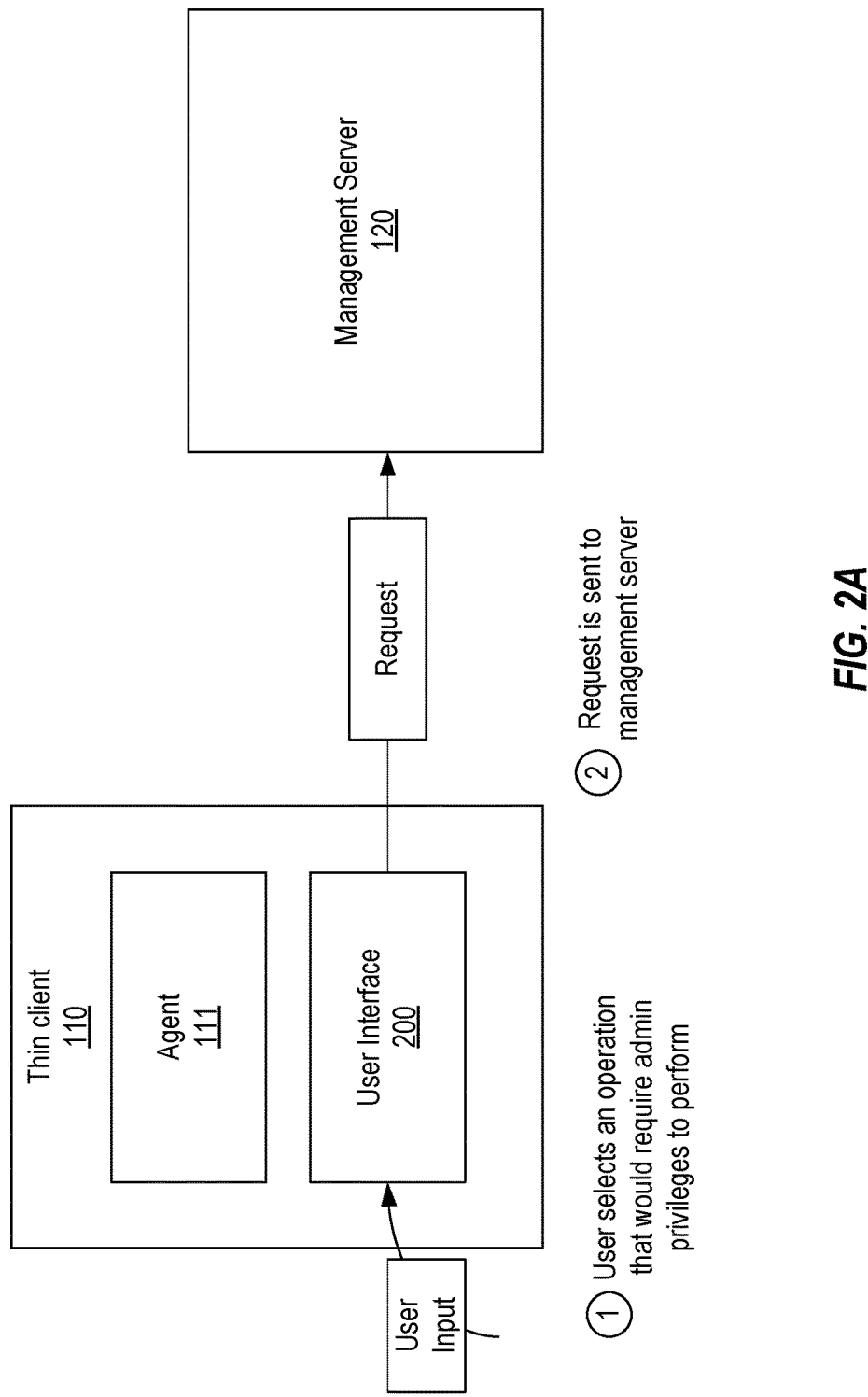
FIGS. 2A-2C illustrate an example sequence of steps that can be implemented to enable users to perform operations that require elevated privileges.
Figure 2B:
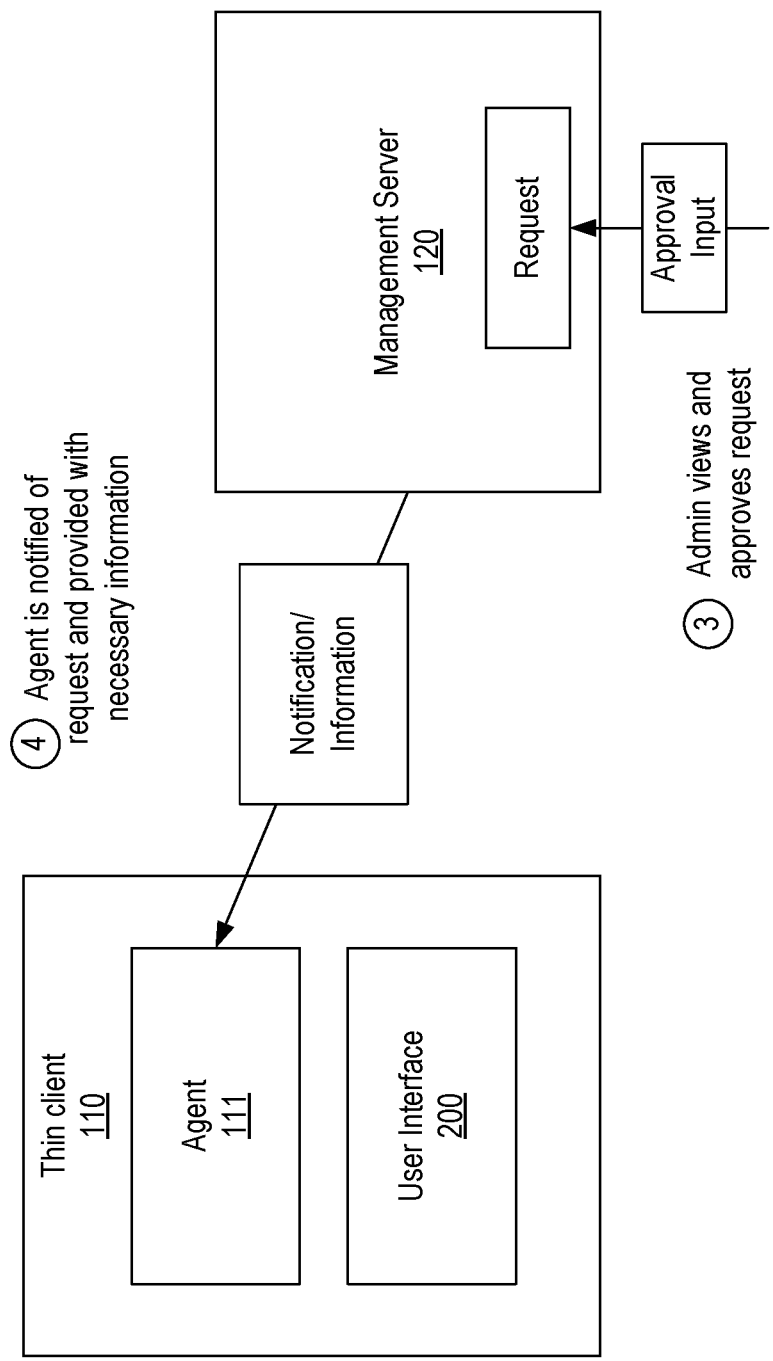
Figure 2C:
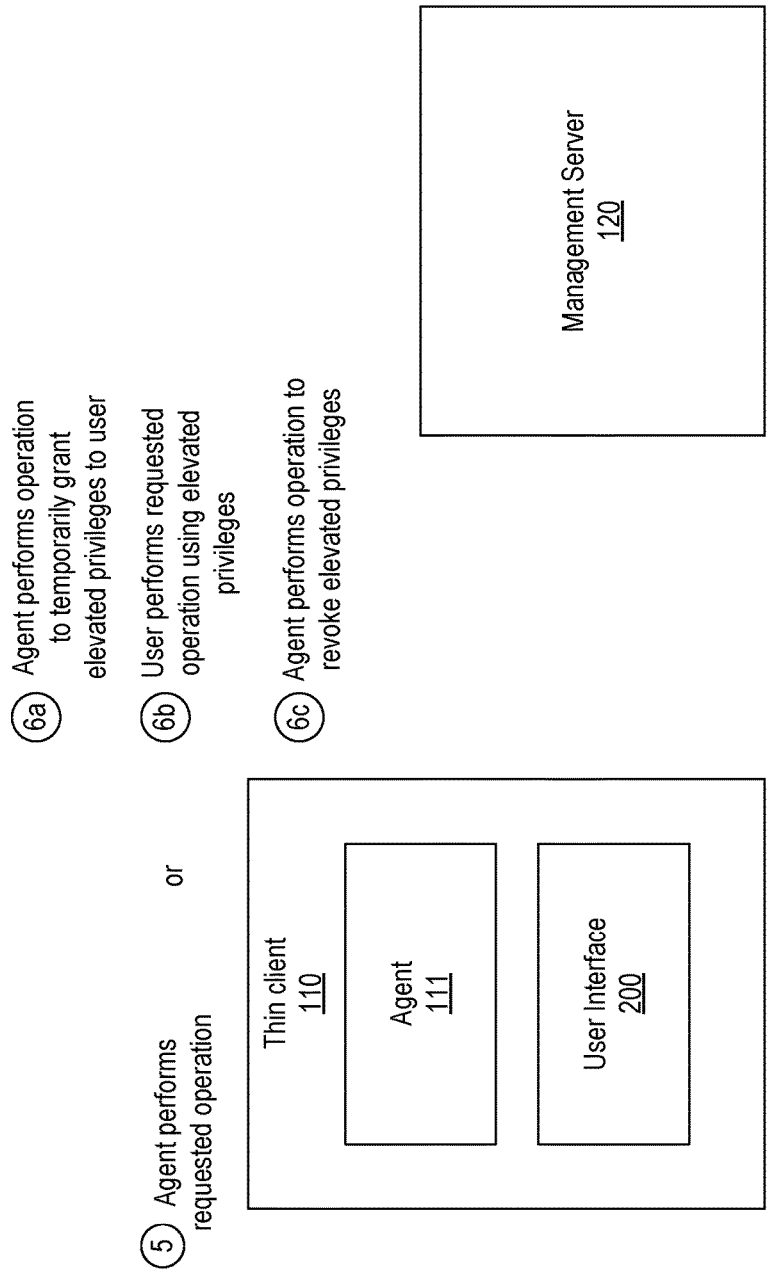

FIGS. 2A-2C illustrate an example sequence of steps that can be performed to enable a user of thin client 110 to perform operations that require elevated privileges in a controlled manner. In this example, it will be assumed that thin client 110 provides a user interface 200 by which a user can request that an operation that requires elevated privileges be performed on thin client 110. User interface 200 could be a website or a custom application. It is noted, however, that the present invention could also be implemented when user interface 200 is not provided or not used. For example, a user of thin client 110 could use any communication channel (e.g., a phone call, an email, in person, etc.) to submit a request to an administrator.

One benefit of providing user interface 200 is that it can present each possible operation that the user can request to be performed such that the user can simply select the desired operation. For example, user interface 200 can list various "change desktop settings" operations, various "change mouse settings" operations, an "enable USB ports" operation, etc. Of course, user interface 200 may also allow the user to submit custom or customized requests (e.g., when user interface 200 may not provide an operation that the user would like to perform or when additional information is necessary to define the operation to perform/enable such as may be the case when the user must specify a custom value for a setting). In cases where user interface 200 is not provided (or when the user does not desire to employ user interface 200), the user may instead employ any suitable communication channel to describe the desired operation to the administrator.

For purposes of the present example, it will be assumed that user interface 200 includes an option for configuring the mouse as either a right hand mouse or a left hand mouse, an option for changing the desktop background, and an option for enabling USB ports. Turning now to FIG. 2A, in step 1, it will be assumed that the user provides input to user interface 200 which selects a particular operation that the user would like to perform but that would require admin privileges. For example, in many cases, the operating system on thin client 110 may not allow a non-administrator user to change the mouse from a right hand mouse to a left hand mouse, to change the desktop background, or to enable access to the USB ports.

In step 2, user interface 200 can generate and send a request to management server 120. This request can identify the operation that the user has requested. In the case that the user input from step 1 included customized information (e.g., a specific value that a particular setting should be changed to), this customized information can be included in the request. In short, the request can include sufficient information to allow an administrator to determine what operation the user would like to perform and to allow management server 120 to instruct agent 111 accordingly. As mentioned above, this request could be submitted via other communication channels such as by calling or emailing the administrator to specify what the user would like to do.

Next, in step 3 shown in FIG. 2B, the administrator can review the request and either approve or deny it. The exact manner in which the administrator reviews a request will vary based on how the request is communicated. When user interface 200 sends the request directly to management server 120, management server 120 can include a user interface for displaying requests to the administrator and for receiving input to approve or deny the request. When the request is communicated in other ways, management server 120 may include a user interface by which the administrator can manually input the request (or at least the necessary information about the requested operation). For example, if the user emailed the administrator a request to change mouse settings, the administrator could provide input to management server 120 indicating that the mouse settings should be changed to a particular value on thin client 110. In short, whether it is received from user interface 200, from administrator input, or some other source, an identification of the requested operation and any information necessary for performing the operation can be received/stored at management server 120.

Management server 120 can be configured to allow the administrator to either approve or deny a request on a case-by-case basis. Management server 120 may also maintain one or more automation policies which identify particular types of requests that can be automatically approved or denied. Such automation policies can include any number and/or combination of criteria by which a particular request can be evaluated. For example, an automation policy may define that any request to change a mouse setting will always be automatically approved, will always be automatically approved for particular users, or will always be automatically approved for particular computing devices. Similarly, an automation policy may define that a particular type of request (e.g., a request that would require the temporary grant of admin privileges) should be automatically denied unless it is received from a particular user on a particular computing device at a particular time. These automation policies can further reduce the burden on the administrators.

Assuming the administrator approves the request in step 3, management server 120 can then notify agent 111 of the requested operation including providing any necessary information to allow the operation to be performed. There are various ways in which agent 111 can be notified. For example, management server 120 could send a notification communication directly to agent 111 which either contains the necessary information or instructs agent 111 to retrieve the necessary information from a particular source. Alternatively, agent 111 could be configured to periodically poll management server 120 to determine whether any operations have been approved.

The information that is provided to/obtained by agent 111 in step 4 can be in any suitable form. For example, management server 120 could store configuration files pertaining to thin client 110. In such a case, when the administrator approves a particular request, the corresponding configuration file(s) could be updated to reflect the requested operation (e.g., by changing a setting to cause the mouse to be left handed or to enable USB ports). Management server 120 could then send the updated configuration file(s) to agent 111 (or agent 111 could retrieve the updated configuration file(s)) and agent 111 could then perform the necessary operation(s) to update the configuration of thin client 110 to match the configuration file(s).

It is to be understood that there are numerous ways that the configuration of thin client 110 can be changed and therefore the exact manner in which agent 111 may be instructed to perform/enable a requested operation is not essential to the invention. Suffice it to say that, when the administrator authorizes an operation that would require admin credentials to perform, agent 111 is provided with sufficient information to know which operation to perform and how to perform it.

Finally, as shown in FIG. 2C, in response to determining that the administrator has authorized some operation on thin client 110, agent 111 can take appropriate steps to either perform the operation directly or to enable the user to perform the operation himself. For example, in step 5, agent is shown as performing the requested operation directly. Step 5 may be performed when the requested operation does not require any additional input/action from the user. For example, if the user has requested that the mouse settings be changed from right handed to left handed, agent 111 could change this setting directly.

In contrast, if it is necessary to enable the user to perform the operation himself, agent 111 can perform an operation or operations to temporarily grant elevated privileges to the user in step 6a. Once elevated privileges have been granted, in step 6b, the user can perform the requested operation himself. As an example, if the user had requested the ability to change the desktop background, agent 111 could temporarily grant elevated privileges that would allow the user to perform this operation. In this case, agent 111 may not know which background the user would like to set and therefore the user will be enabled to do so. Similarly, if the user has requested access to the USB ports, agent 111 could change a setting to enable such access (i.e., the changing of the setting enables the user to perform the requested operation of accessing the USB ports). Finally, in step 6c, agent 111 can perform an operation or operations to revoke the previously granted elevated privileges so that the user will not retain the ability to perform the operation indefinitely. For example, agent 111 can revoke the elevated privileges which had allowed the user to change the desktop settings or may change appropriate settings to prevent the user from accessing the USB ports.

Although not shown, the time at which step 6c is performed can be based on the information provided/obtained in step 4 or based on a subsequent communication/notification from management server 120. Also, this time could be defined as a duration of time from when agent 111 grants the elevated privileges (e.g., the user may be granted elevated privileges for 30 minutes) or may be defined with reference to a particular event (e.g., the user may be granted elevated privileges until the next reboot or logoff).

Different types of elevated privileges could be granted. For some requested operations, it may only be necessary to change a setting to allow the user to perform the requested operation. For example, the ability to change keyboard settings may be controlled by a configuration setting that can be changed without granting admin privileges to the user. In such cases, agent 111 could change the configuration setting (i.e., perform an operation) in step 6a to allow the user to change keyboard settings (i.e., perform the requested operation) in step 6b, and then change the configuration setting back to its original value in step 6c. For other requested operations, it may be necessary that the user be granted admin privileges. In such cases, the elevated privileges granted in step 6a could constitute admin privileges (which would imply that the user would be able to perform many more operations beyond what was requested). In either of these scenarios, agent 111 performs one or more operations that will temporarily give the user the elevated privileges necessary to perform the requested operation.

Because agent 111 runs with admin privileges, it will not be necessary to reboot or logoff thin client 110 to perform the requested operation in most cases (although some configuration settings may require a reboot even when made by agent 111). Instead, agent 111 can perform the appropriate operations directly using its admin privileges. In contrast, in prior art techniques, it would have been necessary for the user to log off and then for the admin to log in using the admin credentials in order to perform the requested operation. After the operation was performed, the admin would then log off (and possibly reboot) before the user could log in again and resume normal activity. Therefore, by employing agent 111 to perform or enable the requested operation, there is far less downtime and reduced risk.

Figure 3:
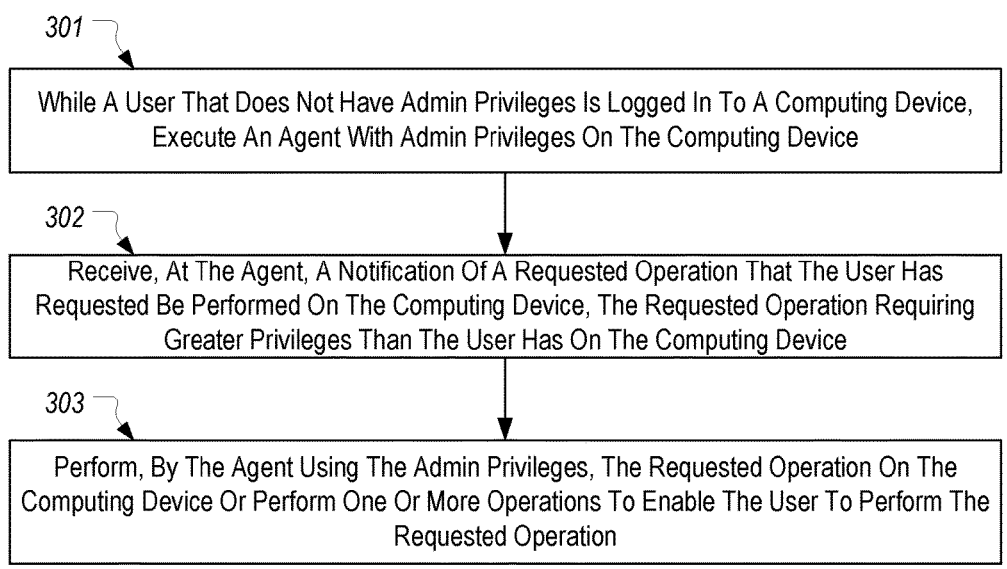
FIG. 3 illustrates a flowchart of an example method for enabling users to perform operations that require elevated privileges.

FIG. 3 provides a flowchart of an example method 300 for enabling a user to perform operations that require elevated privileges. Method 300 can be performed by agent 111 that is executing with admin privileges on a computing device to which a user without admin privileges is logged into.

Method 300 includes an act 301 of, while a user that does not have admin privileges is logged in to a computing device, executing an agent with admin privileges on the computing device. For example, agent 111 can be executed on thin client 110.

Method 300 includes an act 302 of receiving, at the agent, a notification of a requested operation that the user has requested be performed on the computing device, the requested operation requiring greater privileges than the user has on the computing device. For example, agent 111 can interface with management server 120 to determine that an administrator has approved a user's request to perform an operation on thin client 110 that the user does not have sufficient privileges to perform.

Method 300 includes an act 303 of performing, by the agent using the admin privileges, the requested operation on the computing device or performing one or more operations to enable the user to perform the requested operation. For example, agent 111 could change a setting directly to complete the requested operation, could change a setting temporarily to allow the user to perform the requested operation without having admin privileges, or could temporarily grant the user admin privileges.

In summary, by employing an agent that runs with admin privileges, a user can be enabled to perform a number of operations on a computing device that he or she would not otherwise be able to perform without direct administrator access to the computing device or without divulging admin credentials to the user. The present invention can therefore relieve the administrators from performing a large number of burdensome tasks without significantly increasing security risks.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling a user to perform operations that require elevated privileges on a thin client when the user does not have admin privileges and without requiring input of admin credentials, the method comprising:
   while the user that does not have admin privileges is logged in to the thin client, executing an agent with admin privileges on the thin client;
   receiving, at the thin client, user input that identifies a particular operation that the user would like to perform on the thin client but that requires elevated privileges on the thin client such that the logged-in user that does not have admin privileges cannot perform the particular operation on the thin client without input of admin credentials;
   in response to the user input, sending, by the thin client, a request to a management server, the request identifying the particular operation;
   receiving, at the management server, administrator input that approves the particular operation;
   in response to receiving the administrator input, sending, by the management server and to the agent that is executing with admin privileges on the thin client, a notification that the particular operation has been approved; and in response to receiving the notification, performing, by the agent using the admin privileges and while the user that does not have admin privileges remains logged in to the thin client, the particular operation on the thin client or performing one or more other operations on the thin client to enable the user to perform the particular operation such that the particular operation is performed without input of admin credentials.

2. The method of claim 1, wherein the particular operation comprises changing a setting of the thin client.

3. The method of claim 2, wherein the notification includes a value that the setting is to be set to.

4. The method of claim 1, wherein the one or more other operations comprise granting elevated privileges to the user.

5. The method of claim 1, wherein, in response to receiving the notification, the agent first retrieves, from the management server, information to be used to perform the particular operation on the thin client and then performs the particular operation using the retrieved information.

6. The method of claim 1, wherein the agent periodically polls the management server to determine whether the user has requested any operations, and the agent receives the notification in response to the periodic polling.

7. The method of claim 1, wherein the particular operation or the one or more other operations comprise granting access to a function on the thin client, the method further comprising:

performing another operation at a subsequent time to revoke the access to the function.

8. The method of claim 7, wherein the subsequent time is defined in conjunction with the receipt of the notification, or is defined in a subsequent notification.

9. The method of claim 7, wherein the subsequent time is a duration of time from a time when the particular operation is performed or is a subsequent event.

10. The method of claim 1, wherein the user input that identifies the particular operation is received via a user interface that allows the user to select from among a number of operations that require elevated privileges on the thin client.

11. The computer storage media of claim 1, wherein the particular operation comprises changing a setting of the thin client.

12. The computer storage media of claim 11, wherein the notification includes a value that the setting is to be set to.

13. One or more computer storage media storing computer executable instructions which when executed implement a method for enabling a user to perform operations that require elevated privileges on a thin client when the user does not have admin privileges and without requiring input of admin credentials, the method comprising:

while the user that does not have admin privileges is logged in to the thin client, executing an agent with admin privileges on the thin client;

receiving, at the thin client, user input that identifies a particular operation that the user would like to perform on the thin client but that requires elevated privileges on the thin client such that the logged-in user that does not have admin privileges cannot perform the particular operation on the thin client without input of admin credentials;

in response to the user input, sending, by the thin client, a request to a management server, the request identifying the particular operation;

receiving, at the management server, administrator input that approves the particular operation;

in response to receiving the administrator input, sending, by the management server and to the agent that is executing with admin privileges on the thin client, a notification that the particular operation has been approved; and in response to receiving the notification, performing, by the agent using the admin privileges and while the user that does not have admin privileges remains logged in to the thin client, the particular operation on the thin client or performing one or more other operations on the thin client to enable the user to perform the particular operation such that the particular operation is performed without input of admin credentials.

14. The computer storage media of claim 13, wherein the one or more other operations comprise granting elevated privileges to the user.

15. The computer storage media of claim 13, wherein, in response to receiving the notification, the agent first retrieves, from the management server, information to be used to perform the particular operation on the thin client and then performs the particular operation using the retrieved information.

16. The computer storage media of claim 13, wherein the agent periodically polls the management server to determine whether the user has requested any operations, and the agent receives the notification in response to the periodic polling.

17. The computer storage media of claim 13, wherein the particular operation or the one or more other operations comprise granting access to a function on the thin client, the method further comprising:

performing another operation at a subsequent time to revoke the access to the function.

18. The computer storage media of claim 17, wherein the subsequent time is defined in conjunction with the receipt of the notification, or is defined in a subsequent notification.

19. The computer storage media of claim 17, wherein the subsequent time is a duration of time from a time when the particular operation is performed or is a subsequent event.

20. A method for enabling a user to perform operations that require elevated privileges on a thin client when the user does not have admin privileges and without requiring input of admin credentials, the method comprising:

while the user that does not have admin privileges is logged in to the thin client, executing an agent with admin privileges on the thin client;

providing, on the thin client, a user interface that presents a plurality of operations that require elevated privileges on the thin client and that enables the user to select from among the operations;

receiving, via the user interface, user input that selects a particular operation of the plurality of operations, the user input indicating that the user would like to perform the particular operation on the thin client;

in response to the user input, sending, by the thin client, a request to a management server, the request identifying the particular operation;

receiving, at the management server, administrator input that approves the particular operation;

in response to receiving the administrator input, sending, by the management server and to the agent that is executing with admin privileges on the thin client, a notification that the particular operation has been approved; and in response to receiving the notification, performing, by the agent using the admin privileges and while the user that does not have admin privileges remains logged in to the thin client, the particular operation on the thin client or performing one or more other operations on the thin client to enable the user to perform the particular operation such that the particular operation is performed without input of admin credentials.

* * * * *